United States Patent [19]

Luck et al.

[11] 4,175,105

[45] * Nov. 20, 1979

[54] POST-PRESS MOLDING OF MAN-MADE BOARDS TO PRODUCE CONTOURED FURNITURE PARTS

[75] Inventors: Allan J. Luck, Marengo; John T. Clarke; Michael R. Hoffman, both of St. Charles, all of Ill.

[73] Assignee: Masonite Corporation, Chicago, Ill.

[*] Notice: The portion of the term of this patent subsequent to Nov. 20, 1996, has been disclaimed.

[21] Appl. No.: 819,876

[22] Filed: Jul. 28, 1977

Related U.S. Application Data

[63] Continuation-in-part of Ser. No. 739,184, Nov. 5, 1976.

[51] Int. Cl.$^2$ ............................................. B29J 5/04
[52] U.S. Cl. ..................................... 264/112; 264/118; 264/119; 264/120; 264/128; 264/134
[58] Field of Search ............... 264/119, 120, 134, 128, 264/118, 320, 112

[56] References Cited

U.S. PATENT DOCUMENTS

| | | | |
|---|---|---|---|
| 1,953,832 | 4/1934 | Waldemar | 162/163 |
| 3,562,376 | 2/1971 | Hameister et al. | 264/134 |
| 3,758,357 | 9/1973 | Akerson et al. | 264/134 |
| 4,007,076 | 2/1977 | Clarke et al. | 264/120 |

FOREIGN PATENT DOCUMENTS

739378 7/1966 Canada ................................ 264/120

Primary Examiner—Robert F. White
Assistant Examiner—James R. Hall
Attorney, Agent, or Firm—Mason, Kolehmainen, Rathburn & Wyss

[57] ABSTRACT

A method of molding a cellulosic fiber containing board at a temperature of at least 525° F. to provide a relatively high density skin on at least one surface. A fibrous composition, including cellulosic fibers, is consolidated to form a blank having a density of less than 35 pounds/cubic foot. The blank is then cut to a shape larger in at least two of its three dimensions than corresponding dimensions of a mold cavity when said mold is in a closed position. Urea is then included in at least a surface layer of fibers of the blank in an amount of at least 5% based on the dry weight of the fibers contacted with urea, and thereafter the cut blank is molded to form a contoured product having a skin on at least one surface thereof, the skin defined by a thickness of material on said surface of said product having a density greater than the material on which the skin is formed.

15 Claims, 7 Drawing Figures

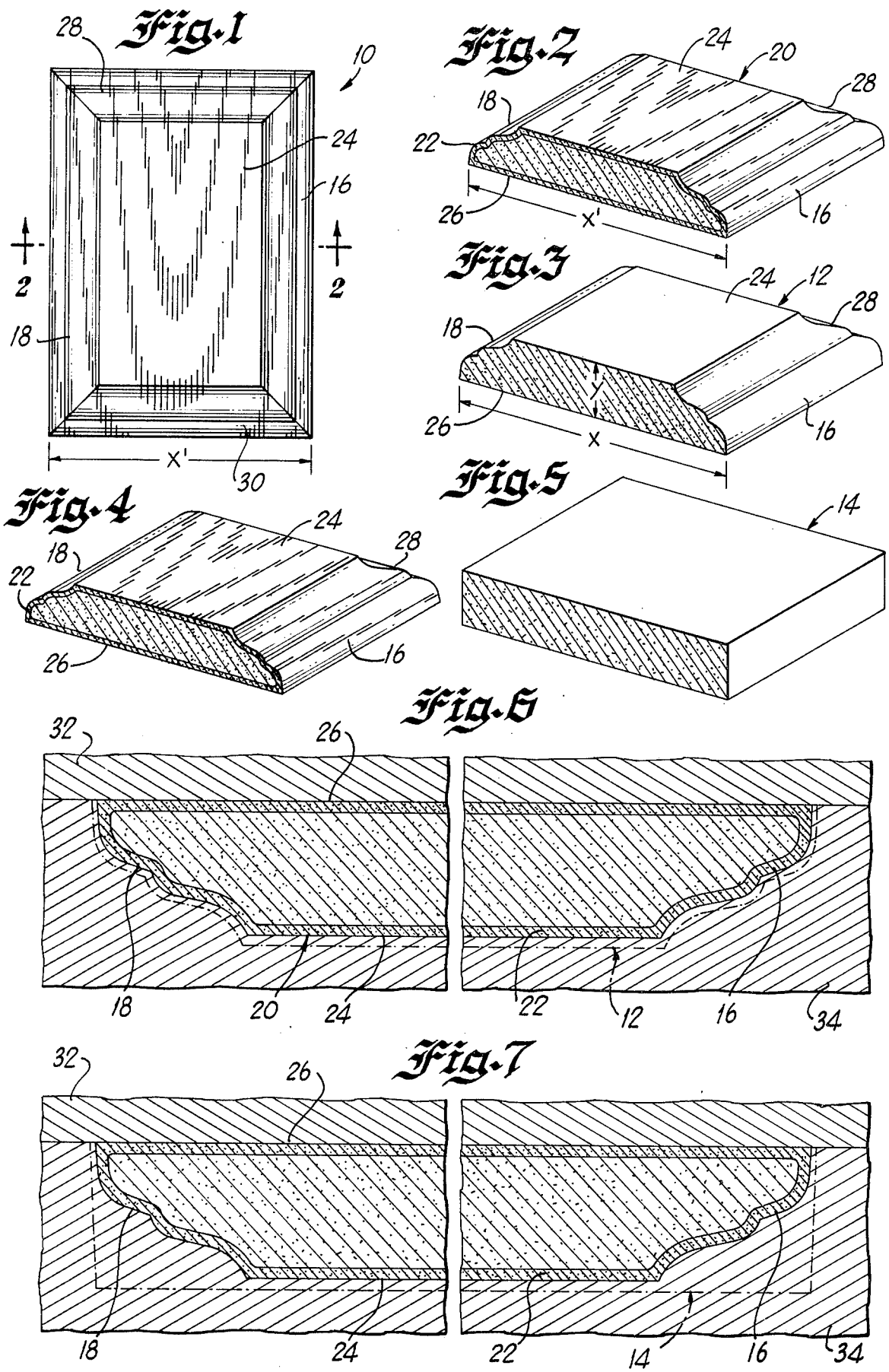

POST-PRESS MOLDING OF MAN-MADE BOARDS TO PRODUCE CONTOURED FURNITURE PARTS

CROSS-REFERENCE TO RELATED APPLICATIONS

This application is a continuation-in-part of our co-pending application Ser. No. 739,184 filed Nov. 5, 1976, the disclosure of which is hereby incorporated by reference.

FIELD OF THE INVENTION

The present invention relates to a method of molding man-made boards to produce contoured furniture parts having relatively high density skins or surface portions thereon. More particularly, the present invention relates to a method of molding a man-made fiberboard to produce a contoured furniture part, such as a drawer front, having high density skins or surface portions as an integral part of a lower density core material. The high density skins are produced by contracting the surface fibers of a consolidated fiberboard with urea, and thereafter hot-pressing the fiberboard in a post-press or second press molding operation at a temperature of at least 525° F. to form the fiberboard into its final shape and to densify the surface portions into stiff, hard skins.

BACKGROUND OF THE INVENTION

The process of the present invention relates to a "post-press" or second press molding operation for molding a fiberboard into a desired shape while, at the same time, creating thick, hard, integral surface portions on the surfaces of a man-made fiberboard substrate. The fiberboard substrate is formed by consolidating a mass of fibers. This may be done by either the dry process or the wet process method of manufacturing fiberboard. Typical products made by these systems are medium density fiberboard and insulation board. The board is thereafter "post-pressed" in a mold having a desired configuration, to form the consolidated fiberboard into a desired shape, to impart surface texture and to form dense surface layers while retaining a lower density core or central portion of the fiberboard. For the purpose of the present invention, a "post-press molding" operation refers to a molding step performed on a consolidated fiberboard which changes the dimensions of the consolidated fiberboard in at least two dimensions.

It is necessary to form the furniture part of the present invention in two separate operations. The first operation forms a consolidated fiberboard common in the art of forming a fiberboard, such as insulation board. The second step comprises "post-press molding" which changes the dimensions of the consolidated fiberboard in at least two dimensions to correspond to the dimensions of the mold, and creates denser surface portions on the fiberboard. It is quite surprising that a "post-press molding" operation is effective in substantially altering the dimensions of the consolidated fiberboard and in densifying the surfaces of the consolidated fiberboard.

It is very difficult to both densify and restructure the surfaces of a consolidated fiberboard without destroying the fiber-to-fiber surface welds referred to in our co-pending application Ser. No. 739,184, filed Nov. 5, 1976. In accordance with the present invention, it has been found that the configuration, surface density, and physical characteristics of a completely consolidated fiberboard mat can be altered in a post-press molding operation when at least the surface fibers of the mat are contacted with urea prior to the molding. During the post-press molding operation, at a temperature of at least 525° F., the urea reacts to stiffen and strengthen the surface layers of a low density cellulosic fiberboard substrate, defined herein as fiberboard having a density in the range of 10–35 pounds/cubic foot, to provide the strength necessary for the product to be useful as a furniture part while, at the same time, restructuring the board to a desired configuration. The resulting lightweight product has a look, feel and sound equivalent to that of natural wood, while being produced at a much lower cost.

PRIOR ART

An article entitled "Wood Embossing Machines Cut Production Steps For 'Carved' Parts" appearing in Furniture Design & Manufacturing, February 1977, pages 30–33, relates to embossing materials, including fiberboard, in making furniture parts. The article does not suggest the use of urea, as disclosed herein.

An extensive search was performed to determine the prior art use of urea in the manufacture of cellulose fiber-containing substrates. Various patents and abstracts were found relating to the use of urea for fire-retardance, plasticization, resistance to aging, and as a binder. None of these patents are abstracts found, however, relates to the use of urea as disclosed herein, in post-press molding of a man-made cellulose fiber-containing product to provide a relatively high density, hard, stiff skin on one or more surfaces of a relatively low density core or center material. The relevant patents and abstracts found in the search are as follows:

| A.B.I.P.C. Abstracts | Patents |
| --- | --- |
| Vol. 36, No. 4; 2483; 1965 | 2,298,017 |
| Vol. 38, No. 6; 4917; 1967 | 2,912,392 |
| Vol. 39, No. 9; 7630; 1969 | 2,912,394 |
| Vol. 39, No. 11; 9657; 1969 | 3,285,801 |
| Vol. 41, No. 5; 4311; 1970 | 3,667,999 |
| Vol. 42, July-Dec; 5715; 1971 | 3,676,389 |
| Vol. 43, No. 9; 9665; 1973 | 3,779,861 |
| Vol. 44, No. 10, 10423, 1974 | 3,790,442 |
| Vol. 44, No. 10; 10754; 1974 | 3,881,992 |
| Vol. 45, July-Dec; 4724; 1974 | 3,915,911 |
| Vol. 45, No. 2; 1479; 1974 | 777,090 (Canada) |
| Vol. 46, No. 3; 2233, 1975 | |
| Vol. 46, No. 5; 4954; 1975 | |

SUMMARY OF THE INVENTION

An object of the present invention is to provide a method for making furniture parts made from man-made fiberboard having the look, feel and sound of natural wood.

Another object of the present invention is to provide a method for making lightweight cellulosic fiber-containing molded furniture part or decorative molding having a hard, dense skin on at least one surface thereof.

Another object of the present invention is to provide a method for making lightweight decorative, molded fiberboard having a central core of material with a density in the range of 10–35 pounds/ft$^3$.

Another object of the present invention is to provide a method for making lightweight man-made molded board having design-fidelity and paint hold-out properties equal to or better than hardboards manufactured in accordance with existing technology.

Another object of the present invention is to provide a method of forming an integral, structural skin on one or more surfaces of a cellulosic fiber-containing consolidated board by including urea within at least the surface fibers of the consolidated board, and, thereafter, molding the urea treated consolidated board in a second-pressing operation at a temperature of at least 525° F.

In accordance with an important feature of the present invention, it has been found that urea will provide hard, dense surface skins to a consolidated handleable mat when the surface fibers are contacted therewith and the mat is thereafter molded at a temperature of at least 525° F.

In accordance with another important feature of the present invention, the technology disclosed herein has been developed to provide a low density, strong cellulosic fiber-containing molded product, for example, molded fiberboard which has sufficient strength for end uses such as furniture parts and decorative moldings. The low density product is produced by first manufacturing a low density substrate having strength sufficient to be handled in manufacture, including urea in at least the surface fibers of the substrate and thereafter molding the consolidated substrate to reshape the substrate and to develop dense outer layers or skins on one or more exterior surfaces.

Surprisingly, it has been found that the skin created by molding a low density consolidated fiberboard having urea in at least the outer surface fibers thereof creates a hard, dense surface which, if desired, effectively and permanently reproduces the details of the mold cavity on the surfaces of the product, permanently reshapes the fiberboard and creates a hard outer surface having excellent holdout of coating materials, such as paint.

BRIEF DESCRIPTION OF THE DRAWING

FIG. 1 is an elevational view of the front of a furniture part manufactured in accordance with the present invention.

FIG. 2 is a cross-sectional, perspective view of a molded, shaped furniture part taken along the lines 2—2 of FIG. 1 molded from the blank of FIG. 3 in accordance with the present invention.

FIG. 3 is a cross-sectional, perspective view of an oversized, shape, low-density handleable blank which is contacted with urea and thereafter molded, as shown in FIG. 6, to produce the part shown in FIG. 2.

FIG. 4 is a cross-sectional, perspective view of a molded, shaped furniture part molded from the blank of FIG. 5 in accordance with the present invention.

FIG. 5 is a cross-sectional, perspective view of an oversized, unshaped, low-density handleable blank which is contacted with urea and thereafter molded as shown in FIG. 4.

FIG. 6 is a cross-sectional view of a closed mold during molding of the oversized, shaped, low-density handleable blank of FIG. 3 and shows the pre-molded shape of the blank in broken lines.

FIG. 7 is a cross-sectional view of a closed mold during molding of the oversized, initially unshaped, low-density handleable blank of FIG. 5 and shows the pre-molded shape of the blank in broken lines.

DETAILED DESCRIPTION OF THE INVENTION

Low Density Handleable Mat

In accordance with the present invention, a fiberboard product having hard, dense skins or surface portions thereon is manufactured in two steps. The first step comprises manufacturing a relatively low density consolidated, handleable mat, using either the wet or dry process as known in the manufacture of man-made boards; the second step comprises post-press molding the consolidated mat, after first treating at least the surface fibers of the mat with urea, to form a skin on the surfaces of the product. The handleable mat is produced in a desired thickness, depending upon the end use, such as a drawer front or cabinet door.

The method of producing a consolidated mat is well known as presently used in producing man-made boards such as hardboard, chipboard, particle board, panelboard, acoustical board, insulation board, and the like. In the wet process, the raw material is uniformly blended in a head box with copious quantities of water to form a slurry. The slurry is deposited onto a water-pervious support member, generally a Fourdrinier wire, where much of the water is removed leaving a wet mat of cellulosic material. The wet mat is then dryed to consolidate the fibers together, as is done in the manufacture of insulation board; or can be transferred from the previous support member and consolidated under heat and pressure to form the board. Typically, pressures of from 400–500 psi and temperatures up to about 400° F. are encountered in hot-press consolidation of a man-made board manufactured by the wet process. The dry process is similar to the wet process except that the cellulosic fibers are first coated with a thermosetting resin binder, such as a phenol-formaldehyde resin, and are then randomly distributed into a mat by air blowing the resin-coated fibers onto a support member. In the dry process, the mat is pressed at temperatures up to about 450° F. and pressures less than about 1000 psi to cure the thermosetting resin and to compress the mat into an integral consolidated structure.

The handleable mat produced in accordance with the first step of the present invention is manufactured in a conventional manner, using conventional cellulosic fiber stock. To achieve the full advantage of the present invention, the handleable mat should have a density, after consolidation, in the range of 10-35 pounds/cubic foot, preferably in the range of 15-30 pounds/cubic foot. Panels of varying thicknesses having densities within this range can be produced in accordance with known technology to provide lightweight core materials on which a surface skin can be developed in accordance with the following disclosure.

Handleable mats have been produced having a density as low as ten pounds/cubic foot and a thickness of one and one-half inches. Mats having densities as low as ten pounds/cubic foot are useful as the handleable mats in producing products in accordance with the principles of the present invention. In fact, in accordance with the present invention, any low density mat (less than 35 pounds/cubic foot) is considered to be handleable if it can survive the trimming, cutting stacking, packing, shipping, and unloading operations necessary to produce fiberboard. All such handleable mats are useful in accordance with the principles of the present invention.

Blank Shaping

The low density fiberboard is cut into blanks, such as that shown in FIG. 5, slightly larger than the finished product in the dimensions in which a surface skin and/or surface design is desired. If a surface skin is required on all six sides of the finished furniture part, the blank is cut slightly larger than the finished part in all dimensions. In this manner, the furniture part is compressed during molding along the dimensions in which the blank is larger than the dimensions of a mold cavity, when the mold is in a fully closed position, to shape the blank where the blank is not initially in exact conformity with the interior dimensions of the closed mold. This compression is necessary to form a thick dense skin on the surface of the furniture part.

A consolidated fiberboard blank having a very low density on the order of 10–25 pounds/cubic foot can be substantially reshaped in the molding process so that it is not necessary to shape the blank to conform to the general interior shape of the closed mold. For example, 10–25 pounds/cubic foot low density fiberboard blanks having a rectangular shape, as shown in FIG. 5, can be molded without shaping.

With higher density consolidated fiberboard blanks having a density, for example, of 25–35 pounds/cubic foot, some material should be removed prior to molding. Consolidated fiberboard blanks having a density of about 25–35 pounds/cubic foot should be cut or routed, as known in the art of shaping natural wood furniture parts, preferably to correspond generally to the shape of the closed mold cavity, with at least two of its three dimensions slightly larger. For example, all dimensions of a 30 pounds/cubic foot blank, used to mold a shaped 15"×7¼"×¾" drawer front, can be larger than the corresponding dimension of the closed mold in all dimensions, as shown in Table VII, to apply a dense skin to all sides of the finished drawer front. The less dense the fiberboard blank, the less closely the shape of the pre-mold blank must conform in shape to the shape of the mold cavity. For example, a fiberboard blank having a density of 25–30 pounds/cubic foot used to form a drawer front having the shape shown in FIGS. 1, 2 and 4 can be formed by first partially shaping a rectangular blank by beveling the side edges, leaving enough extra edge material for compression during molding.

MOLDING

The consolidated fiberboard blank containing urea is post-pressed in a mold at a temperature of at least 525° F. to develop a surface layer herein called a "skin", defined as an outer layer having a higher density than a thickness of material over which it is formed. It was found in early investigations that heat and pressure alone would not form a thick skin on the surface of a low density fiberboard. Skin thickness was very thin, regardless of the temperature and degree of compression. Table I shows that post-pressing alone, without urea pre-treatment does not produce a skin.

Table I

| Effect of Heat, Pressure and Post-Pressing On Skin Development | | | |
| --- | --- | --- | --- |
| Substrate | Final Caliper (In.) | Density lb/ft$^3$ | Skin Thickness (In.) |
| fiberboard not post-pressed | 0.5u3 | 17 | 0 |
| post-pressed fiberboard (no urea) | 0.406 | 22 | 0 |
| fiberboard w/urea on all surfaces and post-pressed at 550° F. | 0.406 | 22 | 0.030 |

Various chemicals were evaluated on the surface of low density consolidated fiberboard blanks, and the skin thicknesses provided by each chemical were measured. Chemicals evaluated were phenol-formaldehyde resin, urea-formaldehyde resin, gelatin, mixtures of gelatin with phenol-formaldehyde, n-methylolacrylamide, and urea. The chemical was applied to the fiberboard blanks prior to molding. For example, urea was applied as an aqueous solution to all surfaces using a paint roller. Urea proved to be unexpectedly superior for skin development on the surface of a cellulosic fiber-containing substrate, particularly for low density (10–35 pounds/ft$^3$) fiberboard blanks, as shown in Table II:

Table II

| | EFFECT OF CHEMICAL SURFACE SPRAY | | | | | | |
| --- | --- | --- | --- | --- | --- | --- | --- |
| | 23/42 Skin Thickness (In.) at Equivalent Cost Level | | | | | | |
| | $5/MFt$^2$ | | $10/MFt$^2$ | | $20/MFt$^2$ | | |
| Chemical | Pounds/MFt$^2$ | Skin Thickness | Pounds/MFt$^2$ | Skin Thickness | Pounds/MFt$^2$ | Skin Thickness | REMARKS |
| urea | 55 | .026 | 111 | .032 | 222 | .033 | Tough, smooth, but poor bond between skin and mat |
| gelatin/ phenol-formaldehyde | 7 | .015 | 15 | .022 | 29 | .030 | Glossy surface film |
| urea-formaldehyde | 42 | .013 | 83 | .019 | 167 | .024 | Hard surface but blistered in spots on all boards |
| n-methylol-acrylamide | 7 | .014 | 14 | .017 | 27 | .018 | Tough, smooth surface with good bond and mat |
| gelatin | 6 | — | 12 | — | 25 | — | When exposed to hot platens the surface gummed up, charred, and stuck to platen |
| phenol-formaldehyde | 24 | .014 | 48 | .014 | 95 | .024 | Reddish brown flat surface, tight bond to mat |

In attempting to achieve thicker surface skins on the consolidated blanks during post-press molding it was found that urea should penetrate the surface fibers of the blank prior to post-press molding. Surface spraying therefore led to the impregnation method of incorporating urea into the blank.

Impregnation Process

It has been found that when urea is impregnated into the surface of a 10-35 pound/cubic foot consolidated fiberboard blank, a much thicker skin can be produced by vacuum impregnating the urea to provide a skin thickness in the range of 0.060 inch. Surprisingly, urea is the only chemical impregnant able to achieve a skin thickness of 0.060 inch, regardless of the depth of penetration of the impregnant.

In accordance with the results achieved as set forth in Table III, each material was applied to the surface of a 20 pounds/cubic foot consolidated fiberboard blank at an equivalent cost level and a vacuum box was utilized on the under surface of the blank to insure deep penetration of the impregnant. After impregnation, each blank was dried so that the moisture content in the mold did not exceed 10% (wet basis). The mold conditions were as follows:

| Mold Temperature | 550° F. |
|---|---|
| Closing Speed | Fast as possible |
| Holding Time at Caliper | 30 Seconds |
| Caliper | 5/8" |
| Pressure | 500 psi |
| Opening Speed | Fast as possible |

Table III
Effect of Impregnation

| Treatment | Caliper (In.) | Density (#/ft³) | Skin Thickness (In.) | % Increase in Skin Thickness Open Surface Spray System |
|---|---|---|---|---|
| phenol-formaldehyde gelatin/ | .615 | 26.5 | 0.47 | 136 |
| phenol-formaldehyde n-methylol- | .611 | 28.8 | .033 | 50 |
| acrylamide | .612 | 24.7 | .031 | 82 |
| urea formaldehyde | .633 | 25.0 | .036 | 89 |
| urea | — | — | .060 | 88 |

The surface characteristics of the low density furniture parts are superior with respect to hardness, design fidelity, and paint holdout. "Design fidelity" or simply "fidelity" as used herein is a measure of the accuracy of reproduction of the mold design onto the surface of a consolidated blank during molding. "Paint holdout" is the ability of a panel to keep paint on its surface without a significant amount striking into the panel.

Some caliper reduction of the blank on at least two of the three dimensions of the blank must result during molding to apply both heat and pressure necessary for thick skin development on each surface where such a skin is desirable. Contact (unregistrable) pressure is sufficient for slight caliper reduction. It has been found that as the fibers are compressed during the molding operation, the density increases in the outer material and, to some extent, in the core material. Thereafter, the core begins to resist compression. Accordingly, the face of the blank will compress more than the core of the oversized blank.

Closing the mold will result in varied mold pressure readings depending upon the degree that the blank is oversized and the shape of the furniture part, and the density of the blank. Consolidated blanks having a density less than about 25 pounds/cubic foot can be oversized in thickness as much as 50% while achieving sharp crisp transferrence of mold details. As the density of the blank is increased, the oversizing of the blank should be reduced to provide good design fidelity. For example, to achieve the full advantage of the present invention, blanks having a density in the range of about 25-30 pounds/cubic foot should not be oversized more than about 30% in thickness.

Table VII relates the consolidated blank size and density to the resulting mold pressure reading in molding a drawer front having the shape of the furniture part of FIG. 1. The 30-35 pounds/cubic foot blanks were each shaped as shown in FIG. 3 prior to urea impregnation and prior to molding; the blanks having a density of 24-29 pounds/cubic foot were each beveled along the edges to partially shape the blank prior to urea impregnation and prior to molding; the blanks having a density in the range of 10-23 pounds/cubic foot were not shaped prior to molding, as shown in FIG. 5.

Table VII
SIZE OF BLANK AND PRESSURE REQUIRED TO MAKE A DRAWER FRONT
Final Product Dimensions 0.750" × 7.250" × 15.0"

| Substrate | Density lbs/ft³ | Thickness (In.) | Width (In.) | Length (In.) | Pressure to Close Mold (psi) |
|---|---|---|---|---|---|
| Fiberboard | 30-35 | 0.850 | 7.281 | 15.031 | 250-400 |
| Fiberboard | 24-29 | 0.950 | 7.328 | 15.078 | 200-300 |
| Insulation Board | 10-23 | 1.125 | 7.328 | 15.078 | 150-250 |

The time of molding is not critical and preferably is in the range of 5 to 60 seconds. However, with higher temperatures in the range of 575°-650° F., it is desirable to remove the product from the mold within about 30 seconds to avoid charring or decomposition of the surface skins.

Amount of Urea

The amount of urea necessary to form a sufficient skin thickness for the purpose of the present invention is at least about 5% by weight of the fibers contacted. That is, when combined by the impregnation process, the weight percent of urea needed is at least 5% based upon the dry weight of the surface material in which the chemical has penetrated. Accordingly, the urea needed is at least 5% based on the weight of fibers penetrated in forming the skin. When combined by the overlay process, the weight percent of urea needed is at least 5% based upon the dry weight of overlay material.

The maximum amount of urea which can be incorporated into the handleable mat is dependent upon the method used to make the handleable mat. Mats made by the wet process can tolerate more urea than mats made by the dry process. The type of resin used in the dry process also has an influence. Phenol-formaldehyde resin bonded blanks can be treated with higher levels of urea than blanks bonded with urea-formaldehyde resins. As the urea content of the surface layers increases, the skins become more distinct and the embossing fidelity and coating holdout improve.

To achieve the full advantage of the present invention, the urea content incorporated into the consolidated blank should be in the range of 8-35% based on the dry weight of the material contacted therewith, and preferably in the range of 10-30% by weight. When a binder other than urea-formaldehyde resin, such as phenol-formaldehyde resin, is used in forming the consolidated blank by the dry process or when a consolidated blank made by the wet process is used, the urea content has no maximum. However, no advantage is realized in terms of skin thickness or other properties by using more than about 35% urea, based on the dry weight of contacted blank material. Accordingly, a useful range of urea is 5–35% based on the dry weight of contacted blank material. When urea-formaldehyde is the sole binder used in forming the consolidated blank, urea can be incorporated by the overlay process in an amount not exceeding about 12% based on the dry weight of overlay material.

MOLDING CONDITIONS

A consolidated blank having a density of less than 35 pounds/cubic foot is "molded" at a temperature of at least 525° F. To achieve the full advantage of the present invention, the temperature of "molding" should not exceed 650° F. It is preferred to mold at a temperature in the range of 525°–575° F. As shown in the drawing, a molded contoured drawer front, indicated generally by reference numeral 10 is molded from a consolidated blank. The consolidated blank can be pre-shaped, as indicated generally by reference number 12 of FIG. 3, or for low density products on the order of 10–25 pounds/cubic foot, the blank can be unshaped, as designated by reference numeral 14 of FIG. 5.

Each blank must be larger than the dimensions of the mold cavity in at least two of its three dimensions to provide surface skins. The blank 12 of FIG. 3 has been shaped by routing along its opposing side edges 16 and 18 to provide a width (x-dimension) which is larger than the x' dimension in the corresponding finished part 20 (FIG. 2). These side edge surfaces 10 and 18 are then contacted with an aqueous urea solution such as by brushing on the urea solution or by application with an absorbent roller, or by any coating method known in the art.

Both of the major surfaces, top surface 24 and bottom surface 26, must be oversized and contacted with urea to prevent the furniture part from buckling. If only one major surface were contacted with urea, stresses would result from the differences in opposing surface characteristics which would cause the part to buckle or warp, along its major surfaces. However, because of the distance of separation between side surfaces 16 and 18 and because of the distance between end surfaces 28 and 30 (FIG. 1), any one of these surfaces can be urea treated without treating the corresponding opposing surface without causing buckling or warping in the part.

It is important that at least two dimensions of a three dimensional part is oversized prior to molding to achieve the compression and heat transfer in the oversized dimensions necessary to impart surface skin 22 to all surfaces which are both oversized and contacted with urea prior to molding. For example, blank 12 (FIG. 3) need only be oversized along the x and y dimensions to provide skins on top surface 24, bottom surface 26 and one or both of side surfaces 16 and 18. If desired, the end edges 28 and 30 (FIG. 1) also can be provided with surface skins.

As shown in FIG. 6, a shaped blank 12 is molded by compressing top mold portion 32 onto bottom mold portion 34 to force blank 12 into the mold and to form the shape of the molded part to correspond to the dimensions of the mold cavity.

Blank 14 can be molded directly, without pre-shaping, as shown in FIG. 7, so long as the blank 14 has a density of less than about 25 pounds/cubic foot. For example, a urea-contacted blank 14 having a pre-mold density of 19 pounds/cubic foot and a thickness of 1.125 inches, when molded at 550° F. for 40 seconds at 250 psi, has a post-molded density of 24 pounds/cubic foot, has excellent transference of design details from the mold cavity, includes a 0.060" skin on all surfaces, and has a look, feel and sound of natural wood.

The product formed by the process of the present invention includes a hard, dense skin having a density in the range of 40–55 pounds/ft$^3$, generally about 50 pounds/ft$^3$. The composition of the skin cannot be determined by analysis. The base layer or core material underlying the skin has a density of 10–35 pounds/cubic foot, so that lightweight products of varying density can be manufactured having hard skins thereon as thick as 0.070 inch.

Although the present invention is described in terms of particular constituents, and ranges thereof, and manner of making and using the same, it is recognized that departures may be made therefrom within the scope of the invention as defined in the appended claims.

We claim:

1. A method of molding a cellulosic fiber contoured board having a skin on at least one surface, comprising:
    (a) compressing a cellulosic fibrous mat to form a consolidated, handleable blank having a density of less than 35 pounds/cubic foot;
    (b) cutting the consolidated blank to a shape slightly larger in at least two dimensions than corresponding interior dimensions of a closed, contoured mold cavity;
    (c) applying to at least one surface of said blank a solution of urea in an amount of at least 5% by weight urea based on the dry weight of the surface fibers penetrated by said solution;
    (d) inserting said cut blank in the open cavity of said mold;
    (e) closing said mold;
    (f) pressing said blank at a temperature of 525°–650° F. to reshape said blank in at least two dimensions to the dimensions of the contoured mold cavity to form a contoured board and form a skin having a density and hardness exceeding the density and hardness of the material thereunder on said surface contacted with said urea solution;
    (g) opening said mold; and
    (h) removing said contoured board.

2. A method of molding a contoured furniture part from a consolidated cellulosic fiberboard, said furniture part having relatively dense skin on at least one of its surfaces comprising:
    (a) cutting a consolidated handleable cellulosic fiberboard blank, having a density of less than 35 pounds/cubic foot, to a size larger in at least two dimensions than corresponding interior dimensions of a closed, contoured mold cavity;
    (b) applying to at least one surface of said cut blank a solution of urea in an amount of at least 5% by weight urea based upon the dry weight of the surface fibers penetrated by said solution;
    (c) inserting said cut blank into the open cavity of said mold;
    (d) closing said mold;
    (e) pressing said cut blank at a temperature of 525°–650° F. to compress and re-shape said blank in at least two dimensions to the shape of the closed mold cavity to produce a contoured furniture part and form a skin having a density and hardness exceeding the material thereunder on said surface on which said urea solution was applied;

(f) opening said mold; and (g) removing said contoured furniture part.

3. A method of manufacturing a contoured board having a relatively dense skin on at least one of its surfaces, comprising:

(a) compressing a cellulosic fibrous mat into a unitary blank having a density less than 35 pounds/cubic foot, (b) cutting said blank to dimensions slightly larger in at least two dimensions than corresponding interior dimensions of a contoured closed mold cavity;

(c) impregnating the surface fibers of one surface of said blank with a urea solution in an amount of at least 5% urea based upon the total dry weight of the surface fibers penetrated;

(d) inserting said impregnating blank into the open cavity of said mold;

(e) closing said mold and pressing said blank in said mold at a temperature of 525°–650° F. for a time sufficient to mold a hard, relatively dense skin having a density and hardness exceeding the density and hardness of the material thereunder on said surface impregnated with said urea solution to form a contoured board having a relatively dense skin.

4. The method of claim 3 where in step (e) the pressure is about 100–500 psi.

5. The method of claim 3 wherein in step (e) the pressure is 30–400 psi.

6. A method of molding a cellulosic fiber contoured board having a skin on at least one surface, comprising;

(a) drying a cellulosic fibrous mat to form a consolidated, handleable blank having a density of less than 35 pounds/cubic foot;

(b) cutting the consolidated blank to a shape slightly larger in at least two dimensions than corresponding interior dimensions of a closed, contoured mold cavity;

(c) applying to at least one surface of said blank a solution of urea in an amount of at least 5% by weight urea based on the dry weight of the surface fibers penetrated by said solution;

(d) inserting said cut blank in the open cavity of said mold;

(e) closing said mold;

(f) pressing said blank at a temperature of 525°–650° F. to reshape said blank in at least two dimensions to the dimensions of the contoured mold cavity to form a contoured board and form a skin having a density and hardness exceeding the density and hardness of the material thereunder on said surface contacted with said urea solution;

(g) opening said mold; and (h) removing said contoured board.

7. A method of molding a cellulosic fiber contoured board having a relatively dense skin on at least one of its surfaces comprising:

(a) cutting a consolidated handleable cellulosic fiberboard blank, having a density of 10–25 pounds/cubic foot, to a size larger in at least two dimensions than corresponding interior dimensions of a closed, contoured mold cavity;

(b) applying to at least one surface of said cut blank a solution of urea in an amount of at least 5% by weight urea based upon the dry weight of the surface fibers penetrated by said solution;

(c) inserting said cut blank into the open cavity of said mold;

(d) closing said mold;

(e) pressing said cut blank at a temperature of 525°–650° F. to compress and reshape said blank in at least two dimensions to the shape of the closed mold cavity to produce a contoured board and form a skin having a density and hardness exceeding the material thereunder on said surface on which said urea solution was applied;

(f) opening said mold; and (g) removing said contoured board.

8. A method of molding to form a cellulosic fiber contoured board and to provide a skin on at least one surface thereof comprising:

(a) depositing a layer of cellulosic fibers onto a support member to form a cellulosic mat;

(b) applying a urea solution to the surface fibers of said mat in an amount of at least 5% by weight based on the dry weight of said surface fibers penetrated by said solution;

(c) drying said mat to form a consolidated blank having a density of 10–35 pounds/cubic foot;

(d) cutting said blank to dimensions larger in at least two dimensions than corresponding interior dimensions of a contoured, closed mold cavity;

(e) inserting said cut blank into the open cavity of said mold;

(f) closing said mold and pressing said blank in said mold at a temperature of 525°–650° F. for a time sufficient to mold a hard, relatively dense skin having a density and hardness exceeding the density and hardness of the material thereunder on said surface to form a contoured board having said skin on said surface.

9. A method of molding to form a cellulosic fiber contoured board and to provide a skin on at least one surface thereof comprising:

(a) depositing a layer of cellulosic fibers onto a support member to form a cellulosic mat;

(b) applying a urea solution to surface cellulosic fibers of said mat in an amount of at least 5% by weight based on the dry weight of said surface fibers penetrated by said solution;

(c) compressing said mat to form a consolidated blank having a density of 10–35 pounds/cubic foot;

(d) cutting said blank to dimensions larger in at least two dimensions than corresponding interior dimensions of a contoured, closed mold cavity;

(e) inserting said cut blank into the open cavity of said mold;

(f) closing said mold and pressing said blank in said mold at a temperature of 525°–650° F. for a time sufficient to mold a hard, relatively dense skin having a density and hardness exceeding the material thereunder on said surface to form a contoured board having said skin on said surface.

10. The method of claim 9 wherein said urea solution is applied to said cellulosic fibers in an amount of 5–35% based on the total dry weight of surface fibers penetrated by said urea solution.

11. A method of forming a hard, dense skin on the surface of a cellulosic fiberboard comprising:

(a) applying a urea solution to the surface fibers of a cellulosic fiber-containing blank in an amount of at least 5% based upon the dry weight of fibers penetrated by said urea solution, said blank having dimensions larger in at least two dimensions than corresponding interior dimensions of a closed mold cavity, and having a density of 10-25 pounds/cubic foot;

(b) inserting the blank into the open cavity of said mold;

(c) closing said mold;

(d) pressing said blank in said mold at a temperature of 525°-650° F. to reshape said blank to the shape of the closed mold cavity and to form said fiberboard with a skin on said fiberboard surface having a density and hardness exceeding the density and hardness of the material thereunder.

12. A method of manufacturing a cellulosic fiber-containing board having a skin on at least one surface thereof comprising:

(a) drying a cellulosic fibrous mat to form a consolidated blank, having dimensions larger in at least two dimensions than corresponding interior dimensions of a closed mold cavity and having a density in the range of 10-25 pounds/cubic foot;

(b) impregnating at least one surface of said blank with a solution of urea in an amount of 5-35% by weight urea based on the dry weight of surface fibers penetrated by said urea solution;

(c) opening said mold;

(d) inserting said impregnated blank into the open cavity of said mold;

(e) closing said mold;

(f) pressing said blank in said mold at a temperature of 525° F. to 650° F. to reshape said blank to the interior dimensions of said mold and to form said board with a skin on said surface having a density and hardness exceeding the density and hardness of the material thereunder; and (g) removing said contoured board from said mold.

13. The method of claim 12 wherein said consolidated blank has dimensions slightly larger in said two dimensions than said interior dimensions of said closed mold cavity.

14. A method of molding to form a cellulosic fiber contoured board and to provide a skin on at least one surface thereof comprising:

(a) compressing a cellulosic mat to form a consolidated blank having a density of 10-35 pounds/cubic foot;

(b) cutting the consolidated blank to a shape slightly larger in at least two dimensions than corresponding interior dimensions of a contoured closed mold cavity;

(c) applying to at least one surface of said blank a solution of urea in an amount of at least 5% by weight urea based on the dry weight of the surface fibers penetrated by said urea solution;

(d) inserting said cut blank in the open cavity of said mold;

(e) closing said mold;

(f) pressing said cut blank in said mold at a temperature of 525°-650° F. to reshape said blank in at least two dimensions to the dimensions of the contoured mold cavity to form a contoured board and form a skin on said surface having a density and hardness exceeding the density and hardness of the material thereunder; and (g) removing said contoured board from said mold.

15. The method of claim 1 wherein the percentage amount of urea in step (c) is 5-35%.

* * * * *